(12) United States Patent
Waldner (10) Patent No.: US 11,234,358 B2
(45) Date of Patent: Feb. 1, 2022

(54) UNIVERSAL ROW CLEARER BRACKET SYSTEM AND METHOD

(71) Applicant: Steve Waldner, Huron, SD (US)

(72) Inventor: Steve Waldner, Huron, SD (US)

(*) Notice: Subject to any disclaimer, the term of this patent is extended or adjusted under 35 U.S.C. 154(b) by 403 days.

(21) Appl. No.: 16/537,448

(22) Filed: Aug. 9, 2019

(65) Prior Publication Data

US 2021/0037696 A1 Feb. 11, 2021

(51) Int. Cl.
| | |
|---|---|
| *A01C 5/06* | (2006.01) |
| *A01B 33/02* | (2006.01) |
| *A01B 33/10* | (2006.01) |
| *A01B 35/16* | (2006.01) |
| *A01B 49/04* | (2006.01) |
| *A01C 7/20* | (2006.01) |

(52) U.S. Cl.
CPC ............ *A01C 5/062* (2013.01); *A01B 33/021* (2013.01); *A01B 33/10* (2013.01); *A01B 35/16* (2013.01); *A01B 49/04* (2013.01); *A01C 7/203* (2013.01); *A01C 7/205* (2013.01)

(58) Field of Classification Search
CPC ....... A01C 5/062; A01C 5/064; A01B 33/021; A01B 33/024; A01B 33/10; A01B 35/16
See application file for complete search history.

(56) References Cited

U.S. PATENT DOCUMENTS

| | | | | |
|---|---|---|---|---|
| 218,412 A | * | 8/1879 | West ...................... | A01C 5/062 111/153 |
| 242,862 A | * | 6/1881 | Bartholomew et al. ..................... | A01C 5/062 111/150 |
| 613,115 A | * | 10/1898 | Brennan et al. ........ | A01C 5/062 111/153 |
| 634,239 A | * | 10/1899 | Harding .................. | A01C 5/064 111/164 |
| 1,159,115 A | * | 11/1915 | Smith ..................... | A01C 5/062 111/144 |
| 5,765,649 A | * | 6/1998 | Le Maigat ........... | A01B 33/021 172/196 |

* cited by examiner

*Primary Examiner* — Tara Mayo-Pinnock
(74) *Attorney, Agent, or Firm* — Christopher Mayle; Bold IP PLLC (57) ABSTRACT

A universal row clearing bracket including a mounting bracket configured to engage a toolbar of a tractor, wherein the mounting bracket may have a yoke engaged therewith. The yoke may connect to a first and second pivoting arm. One end of the pivoting arms configured to engage the yoke such that the yoke prevents the pivoting arms from moving with respect to the receiver past a certain point in at least one direction. The opposite end of the pivoting arms connecting to an interchangeable shoe, the interchangeable shoe configured to pivotally engage at least one engaging wheel and be replaced for other shoes to support different size engaging wheels.

20 Claims, 8 Drawing Sheets

UNIVERSAL ROW CLEARER BRACKET SYSTEM AND METHOD

FIELD OF THE DISCLOSURE

This disclosure relates to the field of agricultural implements and, more particularly, to a universal row clearer bracket, mountable to a toolbar, capable of allowing various apparatuses to be connected.

BACKGROUND

With newer hybrids and multiple varieties of crops, more plant residue is appearing on the ground taking longer to naturally decompose especially depending on the altitude and climate. For instance, in a more northern climate the crop residue takes longer to decompose than in an area with more heat. Crop residue positioned on or around germinating seeds can be devastating to uniform emergence during a crop cycle.

To minimize interference from crop residue, growers have been implementing row clearers. Row clearers should consistently ride on top of the soil, penetrating only deep enough to pick up old crop debris on and just below the soil surface. If the row clearers penetrate too deep, they may push the soil out to the sides. However, sometimes it proves difficult for the row clearers to maintain a constant depth and other parameters due to changing conditions which would alter the depth of the row clearer. Also, there may be varying topography having immovable rocks or other obstructions that would require the row clearer to be able to quickly and freely rise up to a certain height thus elevating over the rocks or obstructions while moving at a constant speed. The row clearer also needs to move quickly back down, leaving a minimum amount of the row cleared.

With frequent stress and movement placed upon the row clearer, replacement parts are needed, which can prove expensive and time consuming. Also, not all row clearers are configured to support different sized and shaped row clearing wheels and actuators, requiring multiple units and providing more cost. Thus, exists a need for a row clearer unit suitable for engagement with different sized row clearing wheels and actuators as well as configured to maintain the row clearing wheels at a specific depth when traversing uneven landscapes.

SUMMARY

The disclosure presented herein relates to a row clearing bracket, comprising, a bracket configured to be rigidly connected to a toolbar, the bracket connected to a yoke, the yoke connected to a first pivoting arm and a second pivoting arm, the first pivoting arm and the second pivoting arm connected to a shoe, the shoe configured to be connected to one or more engaging wheels, wherein the first pivoting arm and the second pivoting arm rotate freely around the yoke for a predetermined range wherein rotational movement of the first pivoting arm and the second pivoting arm is limited by coming into contact with the yoke, wherein the shoe is removably connected to the first pivoting arm and the second pivoting arm, the shoe having a first plate portion and a second plate portion connecting at a juncture point, the first plate portion and the second plate portion having a top edge, the top edge of the first plate portion and the second plate portion connected to a top plate portion, the top plate portion configured to be fastened to the first pivoting arm and the second pivoting arm, the shoe having one or more slots configured to be connected to the engaging wheels, the pivoting arms equally separated from a centerline axis of the yoke, the yoke having a first mounting bracket and second mounting bracket connected to a bottom surface of a bar, the first mounting bracket and the second mounting bracket connected to the first pivoting arm and the second pivoting arm, the first pivoting arm and the second pivoting arm symmetrically curving back inwardly to the central line at a distal end of the first pivoting arm and the second pivoting arm, the first pivoting arm and the second pivoting arm each having an upper arcuate end portion at the proximate end and a lower arcuate end portion at the distal end, the first pivoting arm and the second pivoting arm in contact at the distal end, the lower arcuate end of the first pivoting arm and the second pivoting arm having a portion with a distance between the first pivoting arm and the second pivoting, forming an aperture there in between, a bolt connected through the aperture between the first pivoting arm and the second pivoting arm, the bolt configured to fasten to another apparatus, the bracket having a first bracket and a second bracket, the first bracket and the second bracket having a vertical portion and a horizontal portion, the brackets having semicircular portions on the perimeter of the vertical portion of the first bracket and the second bracket, the semicircular portions having receiving holes therethrough, the receiving holes configured for a fastener to pass through the receiving holes and be fastened to a toolbar.

The disclosure presented herein also relates to a row clearing bracket, comprising, a bracket configured to be rigidly connected to a toolbar, the bracket connected to a yoke, the yoke having a first mounting bracket and second mounting bracket connected to a bottom surface of a bar, the first mounting bracket and the second mounting bracket connected to a first pivoting arm and a second pivoting arm, the first pivoting arm and the second pivoting arm removably connected to a shoe, the shoe configured to be connected to one or more engaging wheels wherein the first pivoting arm and the second pivoting arm rotate freely around yoke for a predetermined range wherein rotational movement of the first pivoting arm and the second pivoting arm is limited by coming into contact with the yoke, the first pivoting arm and the second pivoting arm symmetrically curving back inwardly to the central line at a distal end of the first pivoting arm and the second pivoting arm, the first pivoting arm and the second pivoting arm each having an upper arcuate end portion at the proximate end and a lower arcuate end portion at the distal end, the first pivoting arm and the second pivoting arm in contact at the distal end, the pivoting arms equally separated from a centerline axis of the yoke, the shoe having one or more circular slots configured to be connected to the engaging wheels, the first pivoting arm and the second pivoting arm having an area of less surface area then the area when the first pivoting arm and the second pivoting arm are connected, forming an aperture there in between, and a bolt connected between the area of less surface area of the first pivoting arm and the second pivoting arm configured to fasten to an actuator.

The preceding and following embodiments and descriptions are for illustrative purposes only and are not intended to limit the scope of this disclosure. Other aspects and advantages of this disclosure will become apparent from the following detailed description.

BRIEF DESCRIPTION OF THE DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure.

DETAILED DESCRIPTION

In the Summary above and in this Detailed Description, and the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises," and grammatical equivalents thereof are used herein to mean that other components, ingredients, steps, among others, are optionally present. For example, an article "comprising" (or "which comprises") components A, B, and C can consist of (i.e., contain only) components A, B, and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose lower limit is the first number and the upper limit is the second number. For example, 25 to 100 mm means a range whose lower limit is 25 mm and upper limit is 100 mm.

Certain terminology and derivations thereof may be used in the following description for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The present disclosure recognizes the unsolved need for an improved system and method for the securement or fixation of various shaped and sized soil engaging wheels while also providing an integrated stopping mechanism to limit the vertical positioning of the soil engaging wheels when connected to traverse through uneven landscapes to deliver uniform growth.

Figure 1:
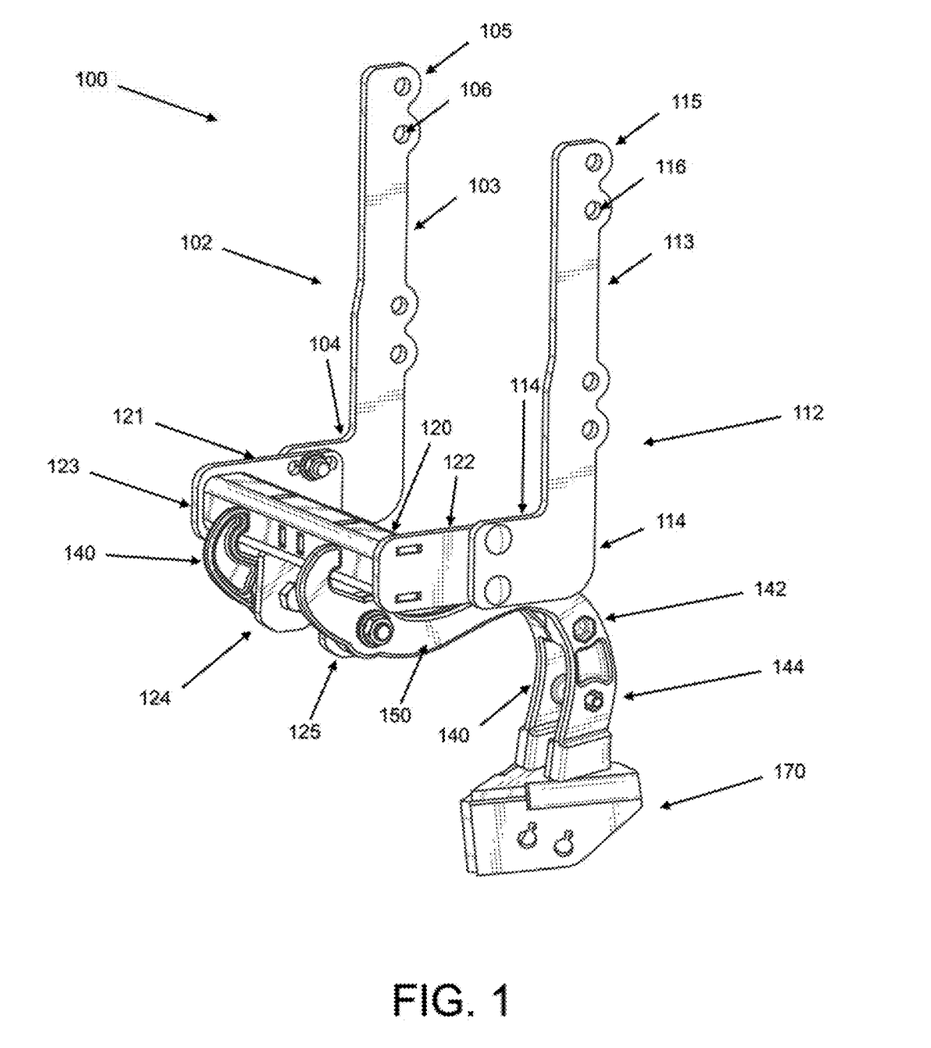
FIG. 1 shows a perspective view of the row clearer bracket.

With reference now to FIG. 1, one exemplary embodiment of row clearer bracket 100, according to the present invention is generally designated. Row clearer bracket 100 may include one or more brackets such as bracket 102 and bracket 112. In one or more embodiments, the body of bracket 102 is substantially the same or identical as the body of bracket 112 having an L-shape with two portions perpendicular to each other.

The L-shape design of bracket 102 and bracket 112 act as a strong structural support for the stabilization of row clearer bracket 100 when connected to the front or aft of the toolbar of a tractor or other device. Bracket 102 and bracket 112 are preferably made of steel but other materials such as iron, bronze, copper, plastics, or other composites may be used.

Bracket 102 and bracket 112 may include an elongated vertical leg such as vertical leg 103 and vertical leg 113 that are generally adapted for rigid attachment to a vertical supporting surface such as an exterior wall of the toolbar. In one or more non-limiting embodiments, vertical legs 103 and 113 may have one or more semicircular portions such as semicircular portion 105 and 115 on the perimeter of the main body of vertical legs 103 and 113. Receiving holes such as receiving holes 106 and 116 may be formed in the semicircular portion 105 and 115 of the vertical legs to allow a fastener such as a bolt to pass through semicircular portions 105 and 115 and allow vertical legs 103 and 113 to be fastened to the exterior wall of the tool bar.

Receiving holes 106 and 116 may be threaded suitably adapted to receive a correspondingly threaded bolt or fastener adapted to fit through the threaded holes. The bolts may be designed to pass into the semicircular portions 105 and 115 and into the tool bar and allow a nut to be screwed up on the screw-threaded portion of the bolt, thus holding vertical legs 103 and 113 to be held firmly in position relative to the tool bar when the nuts are screwed upon the bolt sufficiently. The length of vertical legs 103 and 113 and amount of receiving holes 106 and 116 at different elevations contribute to the universal mounting of Bracket 102 and bracket 112.

Brackets 102 and 112 may include a leg having a smaller length than vertical legs 103 and 113 such as horizontal leg 104 and horizontal leg 114 which are generally horizontally disposed so that a yoke such as yoke 120 may be attached to horizontal leg 104 and horizontal leg 114 and supported therein. In other non-limiting embodiments, brackets 102 and 112 may be curved or curvilinear, elongated members, and may be any size or shape that does not stray from the intent of the present invention.

Yoke 120 may have a horizontal bar such as bar 123 and a plurality of backing plates such as backing plates 121 and 122 wherein backing plates 121 and 122 are on opposite ends of bar 123. In one or more non-limiting embodiments, bar 123 may be made of a plurality of horizontal bars that are at different elevations to provide structural support. Yoke 120 is preferably made of steel but other materials such as iron, bronze, copper, plastics, or other composites may be used. Horizontal legs 104 and 114 and backing plates 121 and 122 may have apertures or openings in coaxial alignment for receiving fasteners to secure backing plates 121 and 122 to horizontal leg 104 and horizontal leg 114. Preferably, the backing plates 121 and 122 contain multiple apertures or openings to allow the yoke 120 to be mounted in different positions, thereby providing mounting flexibility for different toolbar configurations. The apertures or openings may be threaded suitably adapted to receive a correspondingly threaded bolt or fastener adapted to fit through the threaded holes. Backing plates 121 and 122 may have a rectangular shaped frame, although alternative shapes and configurations may be used.

Bar 123 may have semicircular mounting brackets such as mounting brackets 124 and 125 wherein mounting brackets 124 and 125 extend substantially perpendicular from the bottom surface of bar 123. Preferably, the ends of mounting brackets 124 and 125 have a semicircular shape as shown in FIG. 1, but may also have a rectangular shape, partially semicircular/rectangular shape, and so on Mounting brackets 124 and 125 may equally be separated from a centerline axis of bar 123 providing an "ear" or "u" shaped design with the bottom surface of bar 123. Mounting brackets 124 and 125 are designed for pivoting arms such as pivoting arms 140 and 150 to move in a pivotal relation around bar 123. Mounting brackets 124 and 125 may have receiving holes in coaxial alignment for receiving fasteners to secure mounting brackets 124 and 125 to proximal ends of pivoting arms 140 and 150. The one or more receiving holes may be threaded suitably adapted to receive a correspondingly threaded bolt or fastener adapted to fit through the threaded holes.

Pivoting arms 140 and 150 may be equally separated from the centerline axis of bar 123 wherein pivoting arms 140 and 150 symmetrically curve back inwardly to the central line at the distal end of pivoting arms 140 and 150. After pivoting arms 140 and 150 curve back inwardly they may be fastened together by a bolt such as bolt 142 near the distal end of pivoting arms 140 and 150. This orientation having pivoting arms 140 and 150 legs connected near the distal end and angling outward allow for substantially more work under less stress providing more output and greater longevity for row clearer bracket 100.

Figure 2:
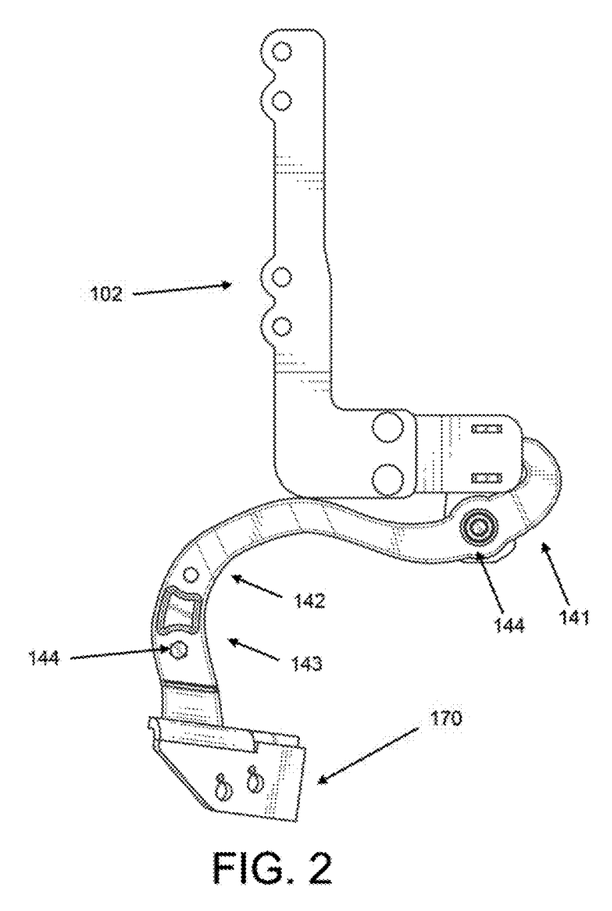
FIG. 2 shows a left view of the row clearer bracket.
Figure 3:
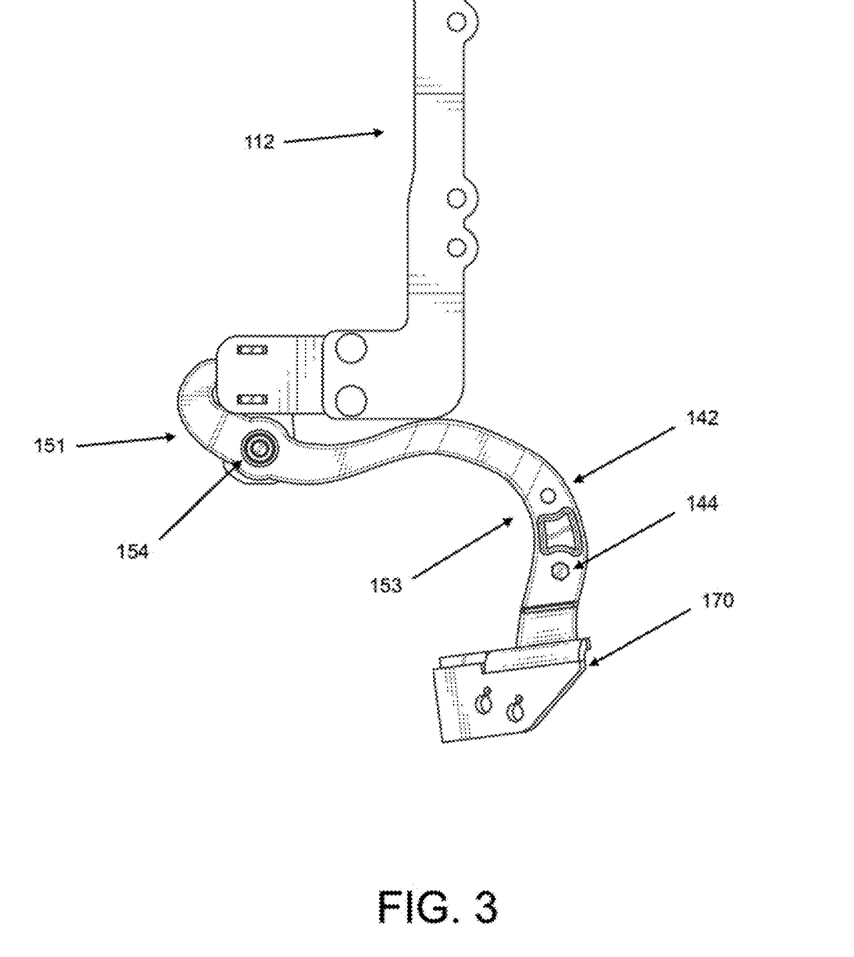
FIG. 3 shows a right view of the row clearer bracket.

As illustrated in FIG. 2 and FIG. 3, pivoting arms 140 and 150 may include an "S" shaped design having an upper arcuate end portion at the proximate end such as upper arcuate ends 141 and 151 and a lower arcuate end portion at the distal end such as lower arcuate ends 143 and 153. Pivoting arms 140 and 150 are preferably made of steel but other materials such as iron, bronze, copper, plastics, or other composites may be used.

Upper arcuate ends 141 and 151 may have one or more receiving holes such as receiving holes 144 and 154. Receiving holes 144 and 154 may have spring bushings pressed into the aperture that may be replaced when worn out, extending the life of pivoting arms 140 and 150. The receiving holes 144 and 154 in upper arcuate ends 141 and 151 and receiving holes in mounting brackets 124 and 125 are located on the same axial plane whereby the holes are coaxially aligned. A screw or bolt then may be threaded or otherwise fastened through receiving holes 144 and 154 in upper arcuate ends 141 and 151 and receiving holes in mounting brackets 124 and 125 to allow pivoting arms to be fastened to yoke.

The fasteners permit rotational movement of pivoting arms 140 and 150 relative to bar 123 of yoke 120 such that pivoting arms 140 and 150 may rotate freely around bar 123 for a predetermined range wherein rotational movement of pivoting arms 140 and 150 may be limited by coming into contact with bar 123 after pivoting arms 140 and 150 reach a specific angle with respect to bar 123. For instance, when upper arcuate ends 141 and 151 are fastened to bar 123 of yoke 120, upper arcuate ends 141 and 151 are arranged such that pivoting arms 140 and 150 reach their lowest position, upper arcuate end portions 141 and 151 will engage a portion of bar 123 of yoke 120 to prevent further downward displacement of pivoting arms 140 and 150 and any associated engaging wheels.

Figure 4:
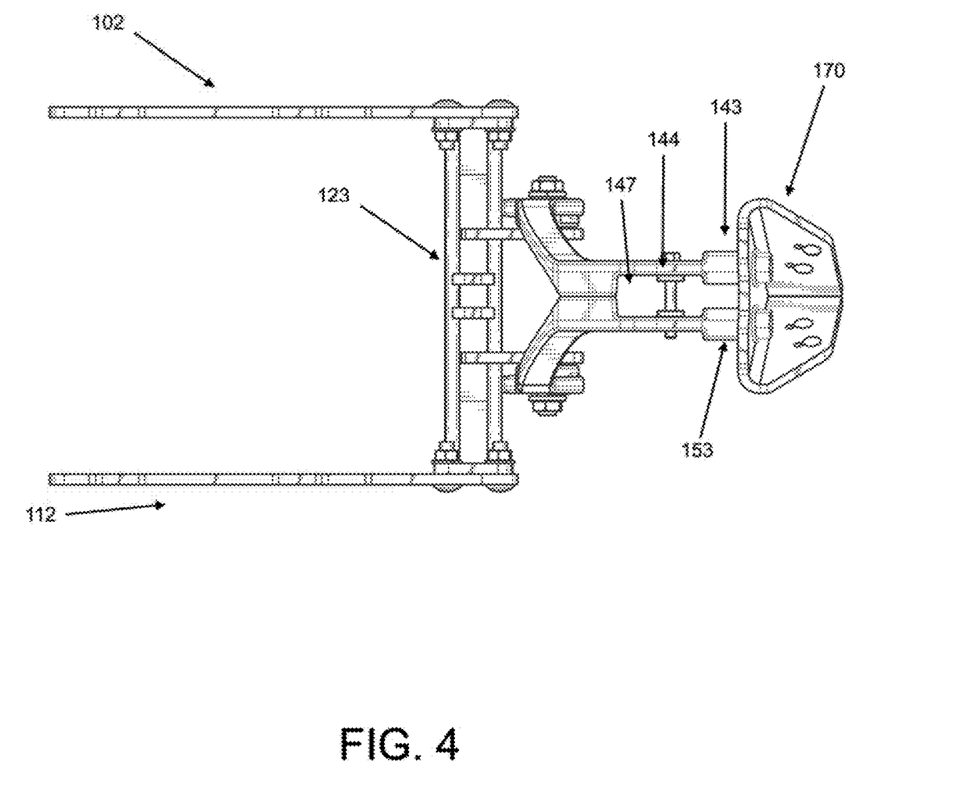
FIG. 4 shows a back view of the row clearer bracket.

As illustrated in FIG. 4, lower arcuate ends 143 and 153 may separate at the distal end wherein lower arcuate ends 143 and 153 have a portion wherein the distance between lower arcuate ends 143 and 153 are greater than where lower arcuate ends 143 and 153 are connected together, the distance integrally forming an aperture such as aperture 147 therein between lower arcuate ends 143 and 153. A bolt such as bolt 144 may be fastened in receiving holes that are coaxially aligned on lower arcuate ends 143 and 153 wherein bolt 144 is positioned in aperture 147 and connects lower arcuate ends 143 and 153 together. Aperture 147 integrally formed allows for other equipment to be connected in between pivoting arm 140 and 150.

In some embodiments bolt 144 may be connected to an actuator (not shown) such as a piston-type hydraulic actuator connected in or reaching between pivoting arms 140 and 150 wherein the downward pressure applied to pivoting arms 140 and 150 urge the clearing wheels against the soil. For example, the piston-type hydraulic actuator may have a piston inside of a hollow cylinder wherein the hollow cylinder contains a spring. Pressurized hydraulic fluid may be supplied by a hose to the cylinder through a port.

Once pressurized hydraulic fluid enters the chamber, pressure in the chamber increases and moves the piston inside the cylinder up against the force caused by the spring. As pressure increases, the piston moves along the axis of the cylinder, creating a linear force. As the piston moves and compresses the spring, a valve opens. The valve is closed again when the hydraulic fluid is drained from the chamber. The piston then may return to its original position by the force of the spring or, in some other embodiments, fluid being supplied to the other side of the piston. In operation, the movement of the piston urges the cylinder in an advancing direction to apply pressure to pivoting arms 140 and 150 to pivot pivoting arms 140 and 150 downwardly, thereby lowering the clearing wheels to urge clearing wheels against the soil. Conversely, the retracting movement of the hydraulic cylinder pivots pivoting arms 140 and 150 upwardly, thereby raising the clearing wheels.

Figure 5:
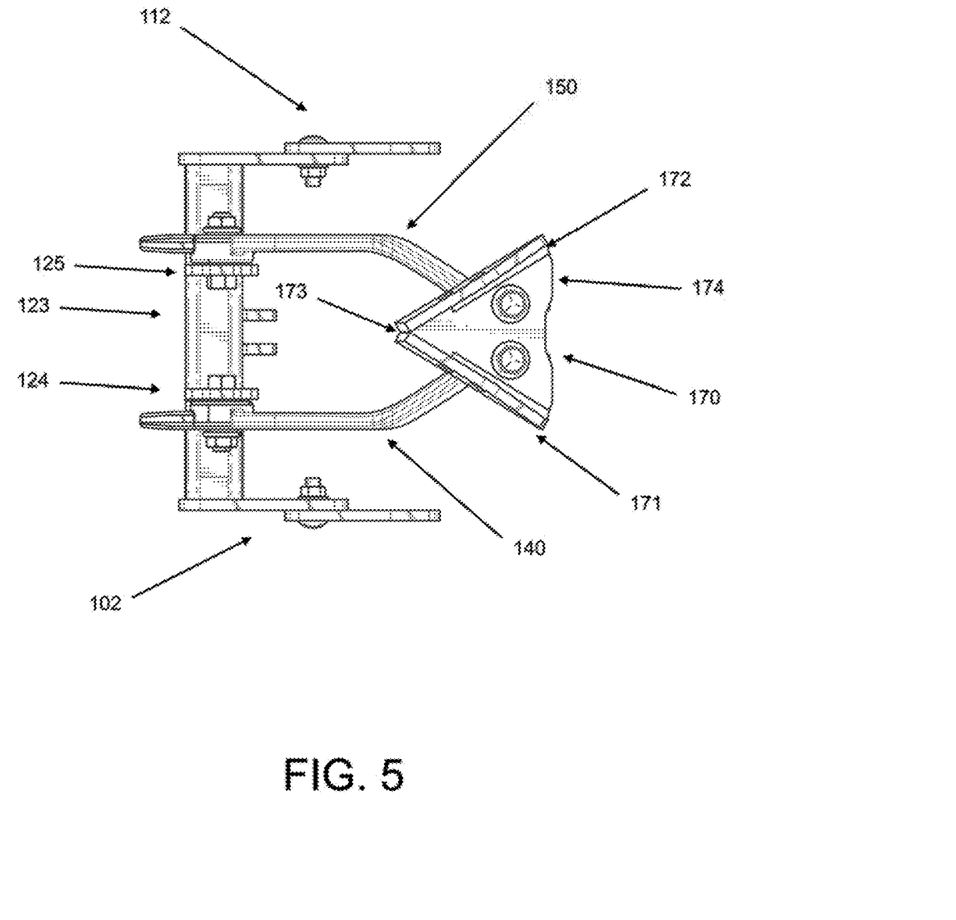
FIG. 5 shows a bottom view of the row clearer bracket.
Figure 6:
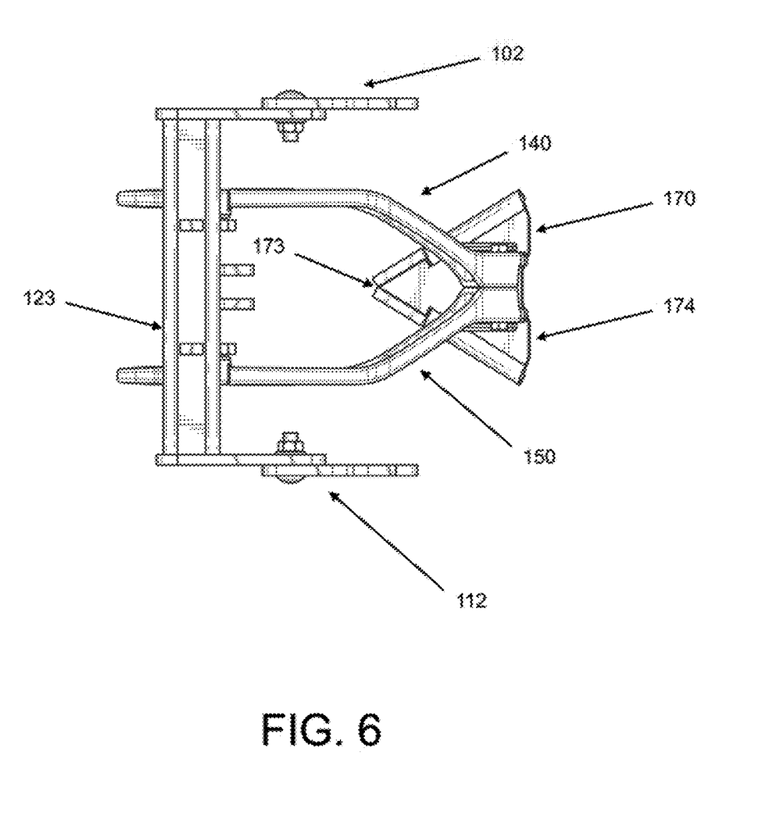
FIG. 6 shows a top view of the row clearer bracket.

The bottom surfaces of lower arcuate ends 143 and 153 of pivoting arms 140 and 150 may be fastened to a top triangular surface such as triangular surface 174 of an interchangeable shoe, such as interchangeable shoe 170, as illustrated in the bottom view of system 100 in FIG. 5 and top view of system 100 in FIG. 6. Interchangeable shoe 170 and pivoting arms 140 and 150 may fastened together by one or more bolts. With interchangeable shoe 170 and pivoting arms 140 and 150 fastened together, a user may rely upon replaceable shoes to install and be connected to substantially all standard sized engaging wheels. Interchangeable shoe 170 may preferably be made of steel but other materials such as iron, bronze, copper, plastics, or other composites may be used. Interchangeable shoe 170 comprises a first trapezoidal plate portion such as first trapezoidal plate portion 171 and a second trapezoidal plate portion such as second trapezoidal plate portion 172.

First trapezoidal plate portion 171 and second trapezoidal plate portion 172 may be right angle trapezoids comprised of parallel top and bottom edges and a back edge creating a right angle with the top and bottom edges. The front edges are at angle in relation to the back edge. First trapezoidal plate portion 171 and second trapezoidal plate portion 172 adjoin at a juncture point such as juncture point 173 and form a 45° to 90° angle directing outward from the juncture point. The top edges of first trapezoidal plate portion 171 and second trapezoidal plate portion 172 may be connected to top triangular portion 174. Interchangeable shoe 170 is preferably made of steel but other materials such as iron, bronze, copper, plastics, or other composites may be used.

Figure 7:
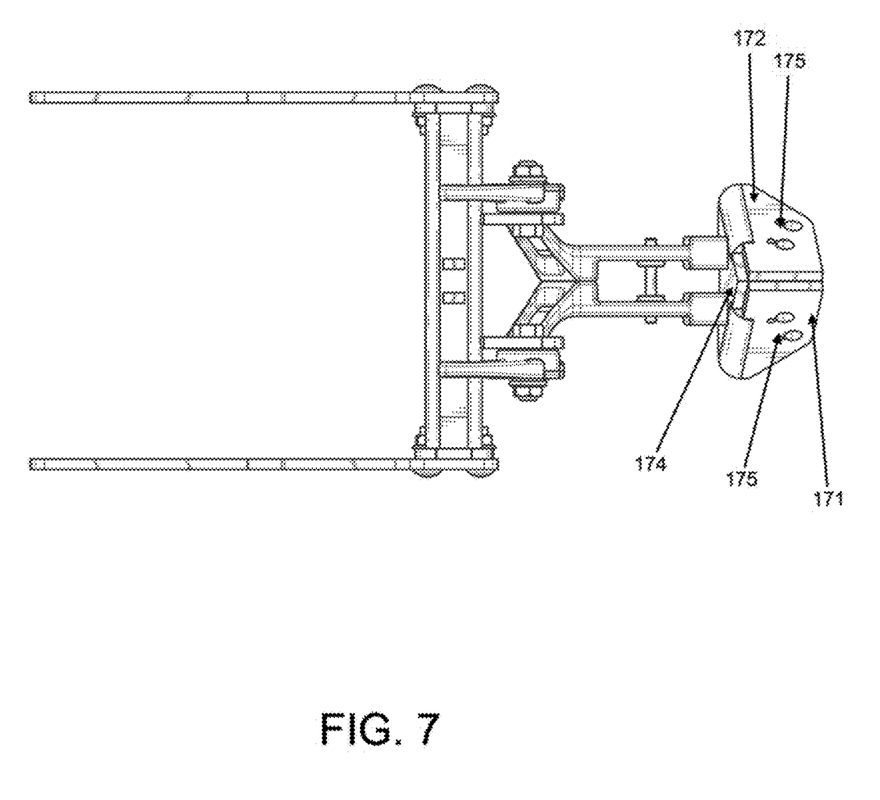
FIG. 7 shows a front view of the row clearer bracket.

First trapezoidal plate portion 171 and the second trapezoidal plate portion 172 may have a plurality of slots such as slots 175. As illustrated in FIG. 7, two sets of two circular slots 175 on first trapezoidal plate portion 171 and second trapezoidal plate portion 172 permit interchangeable shoe 170 to be connected to engaging wheels at an angle. In some embodiments, slots 175 may be rectangular, square, octagonal, hexagonal, or any other shape. Slots 175 may be threaded suitably adapted to receive a correspondingly threaded bolt or fastener adapted to fit through the threaded holes.

Figure 8:
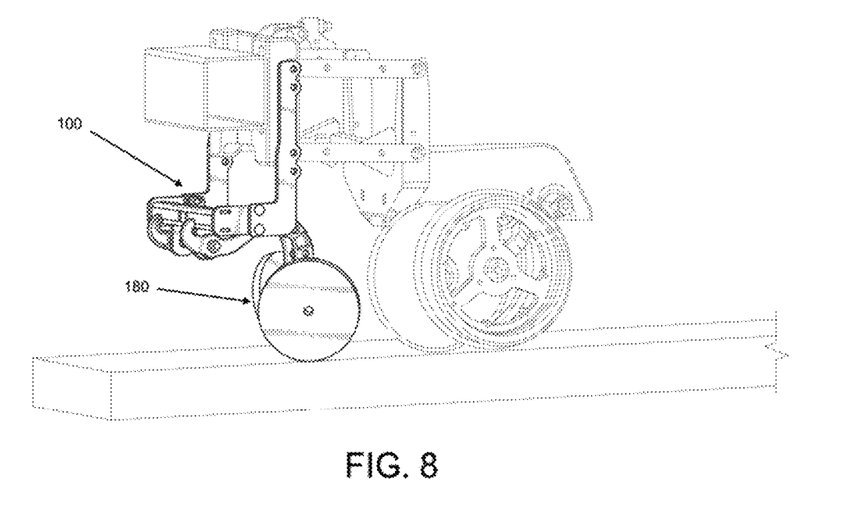
FIG. 8 shows a perspective view of the row clearer bracket connected to a tool bar and engaging wheels.

For example, interchangeable shoe 170 may be connected to one or more engaging wheels such as engaging wheels 180, as illustrated in FIG. 8, wherein at least one engaging wheel 180 may be secured to interchangeable shoe 174 wherein engaging wheels 180 may rotate while connected to interchangeable shoe 170. Engaging wheels 180 may be arranged for rotation about transverse axes and are driven by the underlying soil as engaging wheels 180 are advanced over the soil. The illustrative embodiment of the clearing unit 100 includes two wheel hubs of two engaging wheels connected to trapezoidal plate portion 171 and the second trapezoidal plate portion 172 of interchangeable shoe 170.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

What is claimed is:

1. A row clearing bracket, comprising:
   a bracket configured to be rigidly connected to a toolbar, the bracket connected to a yoke, the yoke connected to a first pivoting arm and a second pivoting arm, the first pivoting arm and the second pivoting arm connected to a shoe, the shoe configured to be connected to one or more engaging wheels, wherein the first pivoting arm and the second pivoting arm rotate freely around the yoke for a predetermined range wherein rotational movement of the first pivoting arm and the second pivoting arm is limited by coming into contact with the yoke.

2. The row clearing bracket of claim 1, wherein the shoe is removably connected to the first pivoting arm and the second pivoting arm.

3. The row clearing bracket of claim 2, the shoe having a first plate portion and a second plate portion connecting at a juncture point, the first plate portion and the second plate portion having a top edge, the top edge of the first plate portion and the second plate portion connected to a top plate portion, the top plate portion configured to be fastened to the first pivoting arm and the second pivoting arm.

4. The row clearing bracket of claim 3, the shoe having one or more slots configured to be connected to the engaging wheels.

5. The row clearing bracket of claim 1, the pivoting arms equally separated from a centerline axis of the yoke.

6. The row clearing bracket of claim 2, the yoke having a first mounting bracket and second mounting bracket connected to a bottom surface of a bar, the first mounting bracket and the second mounting bracket connected to the first pivoting arm and the second pivoting arm.

7. The row clearing bracket of claim 6, the first pivoting arm and the second pivoting arm symmetrically curving back inwardly to the central line at a distal end of the first pivoting arm and the second pivoting arm.

8. The row clearing bracket of claim 7, the first pivoting arm and the second pivoting arm each having an upper arcuate end portion at a proximate end and a lower arcuate end portion at the distal end.

9. The row clearing bracket of claim 8, the first pivoting arm and the second pivoting arm in contact at the distal end.

10. The row clearing bracket of claim 9, the lower arcuate end of the first pivoting arm and the second pivoting arm having a portion with a distance between the first pivoting arm and the second pivoting, forming an aperture there in between.

11. The row clearing bracket of claim 10 further comprising: a bolt connected through the aperture between the first pivoting arm and the second pivoting arm, the bolt configured to fasten to another apparatus.

12. The row clearing bracket of claim 1, the bracket having a first bracket and a second bracket, the first bracket and the second bracket having a vertical portion and a horizontal portion.

13. The row clearing bracket of claim 12, the brackets having semicircular portions on a perimeter of the vertical portion of the first bracket and the second bracket, the semicircular portions having receiving holes therethrough, the receiving holes configured for a fastener to pass through the receiving holes and be fastened to a toolbar.

14. A row clearing bracket, comprising:
   a bracket configured to be rigidly connected to a toolbar, the bracket connected to a yoke, the yoke having a first mounting bracket and second mounting bracket connected to a bottom surface of a bar, the first mounting bracket and the second mounting bracket connected to a first pivoting arm and a second pivoting arm, the first pivoting arm and the second pivoting arm removably connected to a shoe, the shoe configured to be connected to one or more engaging wheels wherein the first pivoting arm and the second pivoting arm rotate freely around yoke for a predetermined range wherein rotational movement of the first pivoting arm and the second pivoting arm is limited by coming into contact with the yoke.

15. The row clearing bracket of claim 14, the first pivoting arm and the second pivoting arm symmetrically curving back inwardly to the central line at a distal end of the first pivoting arm and the second pivoting arm, the first pivoting arm and the second pivoting arm each having an upper arcuate end portion at a proximate end and a lower arcuate end portion at the distal end, the first pivoting arm and the second pivoting arm in contact at the distal end.

16. The row clearing bracket of claim 15, the pivoting arms equally separated from a centerline axis of the yoke.

17. The row clearing bracket of claim 16, the shoe having one or more circular slots configured to be connected to the engaging wheels.

18. The row clearing bracket of claim 17, the first pivoting arm and the second pivoting arm having an area of less surface area then the area when the first pivoting arm and the second pivoting arm are connected, forming an aperture there in between, and a bolt connected between the area of less surface area of the first pivoting arm and the second pivoting arm configured to fasten to an actuator.

19. A row clearing bracket, comprising:
a bracket configured to be rigidly connected to a toolbar, the bracket connected to a yoke, the yoke having a first mounting bracket and second mounting bracket connected to a bottom surface of a bar, the first mounting bracket and the second mounting bracket connected to the first pivoting arm and the second pivoting arm, the first pivoting arm and the second pivoting arm connected to a shoe, the shoe removably configured to be connected to one or more engaging wheels, wherein the first pivoting arm and the second pivoting arm rotate freely around yoke for a predetermined range wherein rotational movement of the first pivoting arm and the second pivoting arm is limited by coming into contact with the yoke, the first pivoting arm and the second pivoting arm symmetrically curving back inwardly to the central line at a distal end of the first pivoting arm and the second pivoting arm, the first pivoting arm and the second pivoting arm each having an upper arcuate end portion at the proximate end and a lower arcuate end portion at the distal end, the first pivoting arm and the second pivoting arm in contact at the distal end, the shoe having a first plate portion and a second plate portion connecting at a juncture point, the first plate portion and the second plate portion having a top edge, the top edge of the first plate portion and the second plate portion connected to a top plate portion, the top plate portion configured to be fastened to the first pivoting arm and the second pivoting arm, the shoe having one or more slots configured to be connected to the engaging wheels.

20. The row clearing bracket of claim 19, the first pivoting arm and the second pivoting arm having an area of less surface area then the area when the first pivoting arm and the second pivoting arm are connected, forming an aperture there in between.

* * * * *